Aug. 21, 1934.                I. W. REYNOLDS ET AL                1,970,819
                                 MEASURING INSTRUMENT
                                  Filed April 6, 1931
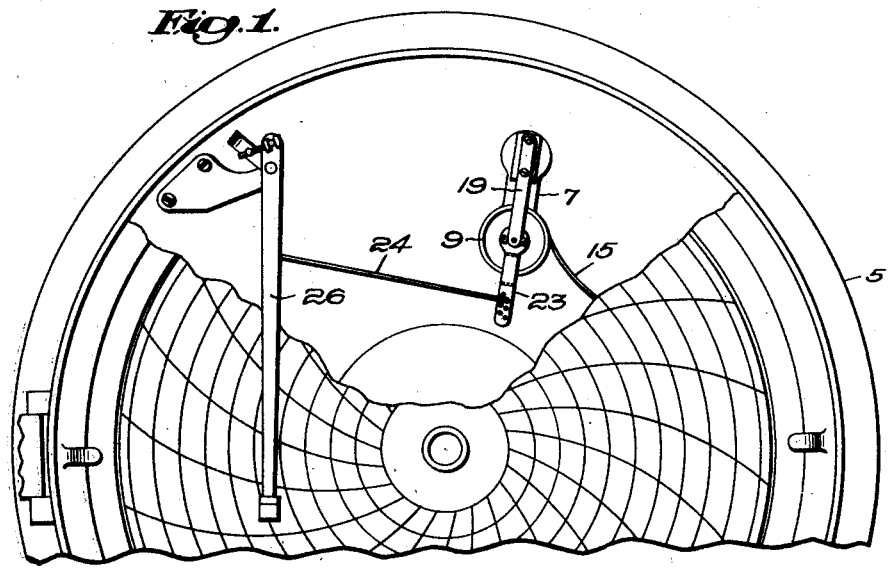
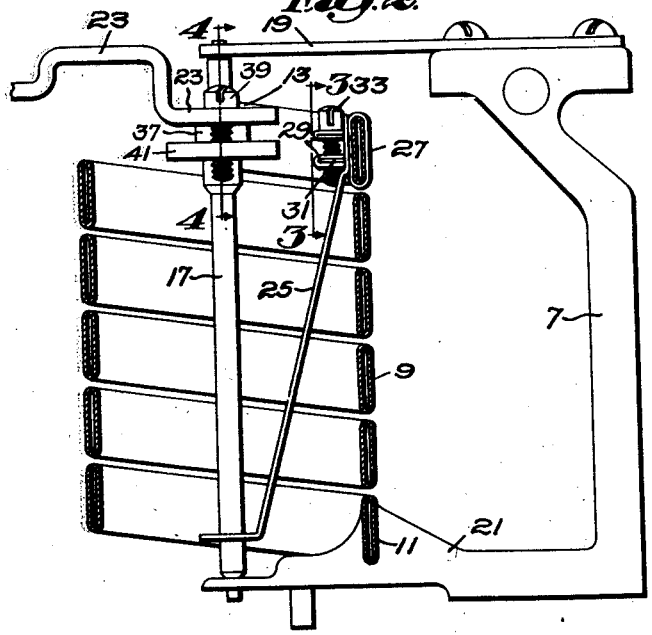
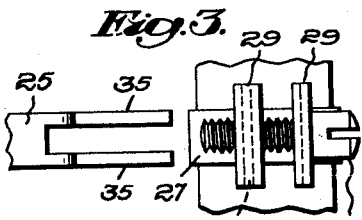
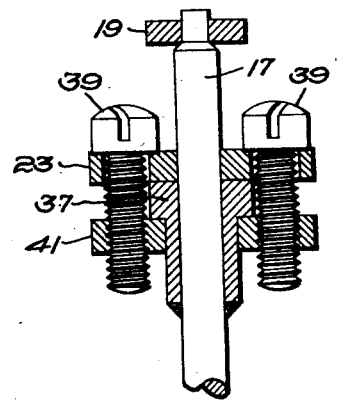
Inventors:
Irving W. Reynolds
Arthur G. Beal
by Emery, Booth, Janney Townsend Attys Patented Aug. 21, 1934

1,970,819

UNITED STATES PATENT OFFICE 1,970,819

MEASURING INSTRUMENT

Irving W. Reynolds and Arthur G. Beal, Foxboro, Mass., assignors to The Foxboro Company, Foxboro, Mass., a corporation of Massachusetts Application April 6, 1931, Serial No. 527,962

6 Claims. (Cl. 73—109)

This invention relates to measuring instruments of the type wherein a sensitive member is distortable responsively to the fluctuations of some variable which it is desired to measure, as, for instance, temperature or pressure. The particular object of the invention is to provide such an instrument embodying improved means for connecting such sensitive device to the part governed thereby, as, for example, a pointer or pen. In its more specific aspects our invention may be considered as an improvement on the device shown in the patent to E. H. Bristol 1,195,334, August 22, 1916, and we have herein illustrated by way of example an instrument of the type shown in that patent and embodying our improvements.

In the drawing:—

Fig. 1 is a partial front elevation of a recording instrument, broken away;

Fig. 2 is a central section through the sensitive device on a larger scale;

Fig. 3 is a detailed plan on a still larger scale showing parts as seen from the line 3—3 of Fig. 2 but separated one from another; and Fig. 4 is a section on the line 4—4 of Fig. 2 on a larger scale.

In the specific instrument shown there is mounted in the casing 5 of the instrument in a suitable support 7 a pressure responsive element exemplified by the helically coiled Bourdon tube 9 having a fixed end 11 mounted upon said support and a sealed free end 13, the tube being of flattened cross-sectional shape and connected by a small capillary pipe 15 (see Fig. 1) to a source of pressure. It will be understood that an increase in pressure, which may be caused by a variation in temperature, will tend to unwind the helically coiled tube 9, thereby producing in the tube a rotary tendency about the axis of the helix.

Located within the tube and substantially coaxial with the helix is a shaft 17 journalled at its opposite ends in bearings formed by the arms 19 and 21 secured to or forming a part of the support 7. An arm 23 is rigidly secured to the shaft to permit utilization of its rotative movement, herein by connecting rod 24 (Fig. 1) which operates by means not fully shown but unnecessary to show or describe in detail, a recording pen 26, a recording instrument having been chosen for purposes of illustration.

Herein the shaft 17 is connected to the free end 13 of the helically coiled tube 7 adjacent the sealed end of the latter by a suitably radially flexible and circumferentially rigid driving connection, herein consisting of a flat strip 25 having the greater dimension of its cross section tangentially disposed. The strip 25 may be connected at one end to the shaft 17 by solder and extends obliquely to the free end 13 of the tube.

The strip 25 may be mechanically clamped to the free end of the tube preferably by means accessible for manipulation from one end of the helix. The specific connecting means herein shown in Figs. 2 and 3 is of a type devised by Charles J. Middleton and Arthur G. Beal disclosed in Patent #1,906,705, issued May 2, 1933 and as such forms no part of the invention herein claimed. Briefly the particular construction shown embodies a band 27 encircling the tube and having lugs 29 of greater width disposed at the interior circumference of the same. A clamping screw 33 cooperates with a nut 31 held by one of the lugs to tension the band about the tube. The end of strip 25 is slotted to provide the arms 35 which may be slipped under the overhanging parts of lugs 29 to be clamped thereby against the tube when the screw is set up.

To secure arm 23 to shaft 17 we likewise utilize a mechanical clamp, the preferred form being shown in detail in Fig. 4. Secured to the shaft is an annular abutment 37, herein provided by the flange of a sleeve soldered to the shaft. The arm 23 has an end opposing the abutment and of sufficient dimension to project laterally beyond the same. Screws 39 passing through this end of the arm tap into a washer 41 engaging the abutment at the rear. It will be seen that the arm 23 may readily be adjusted to desired angular position about the shaft, and when the screws 39 are tightly set up, which may be readily done from the front of the mechanism, the arm is securely clamped in position.

Hitherto in instruments of this kind the connection of the tube to the shaft and of the driven element to the shaft has been effected by means of solder. As it may be desirable to make one or both connections after assembly of the instrument for purposes of calibration, this is inconvenient. Also soldering may affect the qualities of the tube. Notably in the cases of steel tubes plated for purposes of protecting them, it has been the custom hitherto to scrape off part of the plating to permit a solder joint to be made and consequently the protection of the tube has been adversely affected. Similarly the arm 25 by which the shaft is connected to the tube is in such proximity thereto, being practically within the circuit of the tube, as to raise objections to the sort of joint. For instance, the acid used in soldering may spatter on the tube and harm the same. In the present instance it will be understood that the connection of arm 25 to the shaft by solder and of the abutment 37 to the shaft 17 may be effected before the parts are assembled with the tube. Desired adjustments may be made and the remaining connections very simply effected by the use of a screw driver applied from the front.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. In a measuring instrument, in combination with a helically coiled sensitive device having a fixed end and a free end, a shaft extending therethrough and having spaced bearings at the ends of the helix, a strip extending from said shaft, screw operated clamping means for securing the end of said strip to the free end of the device, an arm for utilizing the rotative movement of said shaft, and screw operated clamping means for securing the arm to said shaft at a point between the bearings, the screw extending substantially axially of the helix and having its head exposed at an end of the helix for engagement with an operating device.

2. In a measuring instrument, in combination with a helically coiled sensitive device having a fixed end and a free end, a shaft extending substantially coaxially through the helix, spaced bearings for the shaft at the ends of the helix, means for driving the shaft from the free end of the helix, a radial abutment on the shaft between said bearing and adjacent the helix, an arm for utilizing the rotative movement of the shaft, and means for mechanically clamping the arm substantially axially towards and against said abutment.

3. In a measuring instrument, in combination with a helically coiled sensitive device having a fixed end and a free end, a shaft extending substantially coaxially through the helix, spaced bearings for the shaft at the ends of the helix, means for driving the shaft from the free end of the helix, a radial abutment on the shaft between said bearings and adjacent the helix, an arm for utilizing the rotative movement of the shaft, and a clamp for pressing the arm substantially against said abutment adapted to be set up in any desired position of angular adjustment of the arm about the shaft.

4. In a measuring instrument, in combination with a helically coiled sensitive device having a fixed end and a free end, a shaft extending substantially coaxially through the helix, spaced bearings for the shaft at the ends of the helix, means for driving the shaft from the free end of the helix, an abutment on the shaft between said bearings and adjacent the helix, an arm for utilizing the rotative movement of the shaft, and a clamp for securing the arm to said abutment comprising screw tensioning means accessible for manipulation at an end of the helix.

5. In a measuring instrument, in combination with a curvilinear member tending to straighten responsively to the fluctuations of a variable, a shaft within the curve of said member connected thereto to be rotated thereby, spaced bearings for the shaft at either side of the member, an abutment on the shaft between said bearings, an arm for utilizing the rotative movement of the shaft engaging one side of the abutment, a washer engaging the opposite side of the abutment, and means for drawing together arm and washer to clamp the same on the abutment.

6. In a measuring instrument, in combination, bearings supporting a shaft at its ends, a hollow sensitive tube subject to distortion under internal pressure connected to said shaft to turn the same, and an arm to utilize the rotative movement of said shaft connected thereto between said bearings in close proximity to the tube, the connection comprising an adjustable mechanical clamp comprising a substantially axially extending member having an operating portion presented at an end of the assembly for engagement by a tool.

IRVING W. REYNOLDS.
ARTHUR G. BEAL.